(12) United States Patent
Nikiel et al.

(10) Patent No.: US 6,263,278 B1
(45) Date of Patent: Jul. 17, 2001

(54) SYSTEM AND METHOD FOR GRAPHICALLY ALTERING A PRE-CALCULATED ROUTE

(75) Inventors: Mark A. Nikiel; Nicholas Berry, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/344,542

(22) Filed: Jun. 25, 1999

(51) Int. Cl.$^7$ .................................................. G01C 21/00

(52) U.S. Cl. ...................... 701/210; 701/201; 701/211; 340/995

(58) Field of Search ..................................... 701/201, 202, 701/209, 210, 211, 206; 340/995

(56) References Cited

U.S. PATENT DOCUMENTS

| | | | | |
|---|---|---|---|---|
| 5,340,061 | * | 8/1994 | Vaquier et al. | 244/175 |
| 5,559,707 | * | 9/1996 | DeLorme et al. | 701/200 |
| 5,715,163 | * | 2/1998 | Bang et al. | 701/202 |

* cited by examiner

Primary Examiner—Michael J. Zanelli
(74) Attorney, Agent, or Firm—Christensen O'Connor Johnson Kindness PLLC

(57) ABSTRACT

A system and method for altering a portion of a pre-calculated route by allowing a user to graphically indicate the portion of the route to alter is disclosed. The user indicates the portion to be altered by navigating a pointer to a point along a graphical representation of the route and selecting the point. The point identifies which portion of the route is to be altered. The user may then alter the route by dragging and dropping the selected portion to a new destination. In essence, the user redirects the route to the new destination by dragging the selected portion of the route to the new destination.

20 Claims, 9 Drawing Sheets

SYSTEM AND METHOD FOR GRAPHICALLY ALTERING A PRE-CALCULATED ROUTE

FIELD OF THE INVENTION

The present invention relates to computerized mapping software programs, and more specifically, to computerized mapping software programs that calculate a route between multiple destinations and allow alterations to the calculated route.

BACKGROUND OF THE INVENTION

Computerized mapping products are achieving widespread use today. Such mapping programs are commonly used to automate the task of calculating a route from a starting destination to an ending destination. For the purpose of this discussion, the term "destination" means a point or location on the map at which the user indicates a desire to either start a trip, end the trip, or visit along the trip. A destination may also be known by other names, such as via, vertex, node, stop, or the like. Most mapping programs allow a user to include additional destinations to be visited along the route. The route is typically displayed in a graphical format, allowing the user to visualize the trip. However, existing mapping programs suffer from several problems related to altering a route once it has been calculated.

First, existing mapping programs do not provide a simple mechanism for a user to add a destination to a trip after the route has already been calculated. In other words, if the user identifies some number of destinations to be visited on a trip and then calculates a route to visit all of those destinations, the user cannot easily add a new destination to the trip or substitute a new destination for an existing destination. One reason for the difficulty is that the mapping program must be able to identify where along the route a new destination should be inserted. When adding a new destination, the mapping program must insert the new destination at a point that ensures the new route is reasonably efficient. That task is much more computationally burdensome than it might at first appear.

Computing an ideal order for the destinations to be visited prior to calculating the new route is a problem that mapping-program designers struggle with constantly. Those skilled in the art will appreciate that if a mapping program must compute an ideal order for the destinations, the time required to perform that computation results in an undesirable delay to the user. As a result, most mapping programs simply do not compute a new order, but, rather, add the new destination to the end of the list of existing destinations, which most often results in disjointed routes that are not practical. It would be preferable to allow the user to directly identify the order in which the destinations are visited and, ideally, without undue delay to the user. However, with existing mapping programs, allowing the user to directly identify the order requires substantial manual input and is not intuitively achieved. With existing mapping programs, the user must perform the several steps of deleting an existing destination, inserting the new destination (and possibly having to manually reorder the destinations), and then calculating the entire route anew.

Another problem with existing mapping programs is that imperfect data sometimes results in a route that is impassable. For example, if a one-way street is incorrectly identified as two-way in the mapping data, the mapping program may calculate a route that travels the wrong way down that one-way street. Although the user may have personal knowledge of the inaccuracy, existing mapping programs do not allow the user to easily redirect the route around the one-way street.

Yet another problem with existing mapping programs is that they do not easily allow the user to redirect the route along an alternative path. Often, the user may have a desire to include a particular street or highway along the route as an alternative to those calculated. Perhaps the desired highway borders an ocean or a lake and provides a pleasant view. Perhaps the user has personal knowledge of construction occurring along the calculated route. Existing mapping programs are unable to easily accommodate the user's desire. For two given destinations, the mapping program calculates the same route every time based on route-selection criteria defined in the mapping program. Existing mapping programs do not have a mechanism for easily allowing the user to override the route-selection criteria for a portion of the route and thereby redirect that portion of the route to an alternative path.

Still another problem with existing mapping programs is the situation where a user attempts to calculate a route between generally-described destinations, such as between two cities. Often, the user provides to the mapping program the name of a city as a destination without a more specific descriptor, such as an address. In that case, the mapping program is forced to pick an arbitrary destination within the city, often a pre-selected "city center," the centroid of the city or a famous landmark, for the destination of the route. The user may desire to move the pre-selected destination to a more accurate destination, such as a particular address or building. With existing mapping programs, the user cannot easily relocate the arbitrarily selected destination without reentering the destinations with the more specific descriptors.

Those and other problems render the existing systems and methods less than satisfactory. Until now, an adequate solution to those problems has eluded those skilled in the art. Accordingly, there is a need for a system or method of allowing a user to input, in a simple manner, additional or alternative destinations to be visited along a pre-calculated route. The system or method should also provide the ability to redirect a portion of the calculated route if desired.

SUMMARY OF THE INVENTION

The present invention overcomes the problems identified above by providing a system and method for altering a portion of a pre-calculated route by allowing a user to graphically indicate the portion of the route to alter. The user indicates the portion to be altered by navigating a pointer to a point along a graphical representation of the route and selecting the point. The point identifies which portion of the route is to be altered. The user may then alter the route by dragging and dropping the selected portion to a new destination. In essence, the user redirects the route to the new destination by dragging the selected portion of the route to the new destination.

In this manner, the user is able to add a new destination to be visited by simply dragging a portion of the route to the new destination. The need for the mapping program to calculate which portion of the route to alter is eliminated because the user selects the appropriate portion directly. In short, the present invention allows a mapping program to identify the appropriate portion of a pre-calculated route to alter based on the user's first selection, and to identify a new destination through which the route will be redirected based on where the user drops the route. The portion may be either a destination along the route or part of the route itself The invention simplifies the act of replacing an existing destination with a new destination. The user drags the route from an existing destination to a new destination, which results in replacing the existing destination with the new destination in one simplified and intuitive step.

One advantage of the present invention is that the entire route need not be completely recalculated each time an alteration is made. Only the portion of the route that was altered need be recalculated. In other words, if a pre-calculated route travels from point one to point two to point three, and the user graphically selects the portion of the route between point two and point three, then only the portion of the route between point two and point three need be recalculated, not the entire route. Consequently, not only does the present invention simplify the task of altering a portion of the route, the computational time for recalculating the altered route is shortened as well.

Another advantage of the present invention is that the user is able to, in essence, override the route-selection criteria for a portion of the route. Therefore, if the user desires to take an alternative path for only a small portion of the pre-calculated route, the user may simply drag that portion of the route to the desired alternative path and the route is redirected.

Still another advantage of the present invention is that the user may easily fine-tune the route. For example, if the user entered a general description, such as a city name, for a destination, the mapping program will select a predefined destination within the city to include in the route. However, the present invention allows the user to move the arbitrarily selected destination to a more accurate destination with relative ease.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a system and method for graphically altering a pre-calculated route. Briefly described, the invention allows the direct alteration of a graphical representation of a pre-calculated route. The invention provides a graphical representation of the pre-calculated route and accepts input from a graphical input device. The input identifies a portion of the pre-calculated route to be altered and an alteration to be performed. Based on that input, the invention alters the pre-calculated route. The present invention may be embodied in a mapping program, such as the "Expedia Streets & Trips 2000" mapping program owned and licensed by the Microsoft Corporation of Redmond, Wash.

Figure 1:
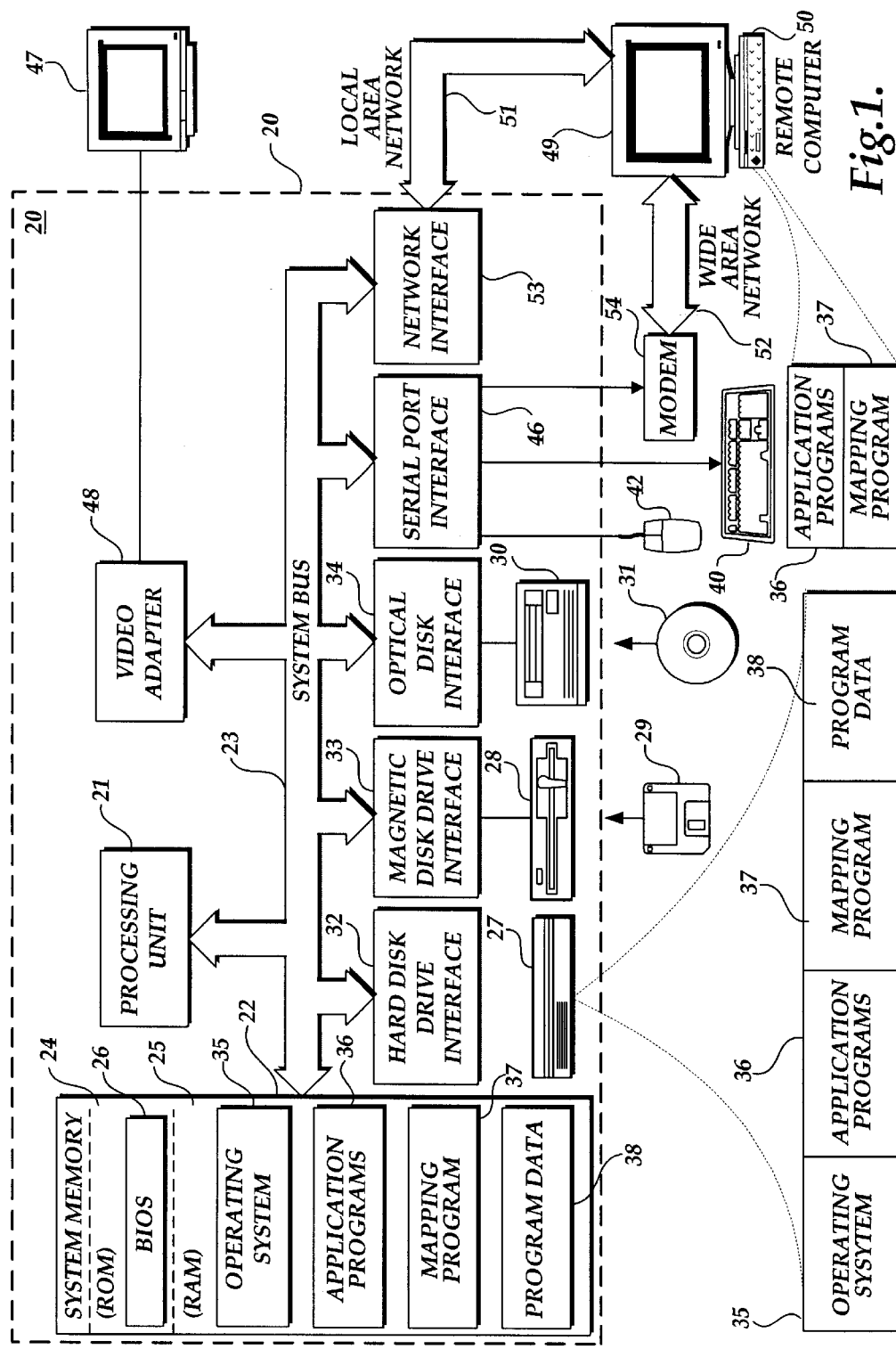
FIG. 1 is a block diagram of a computer that provides the exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other-optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 25, including an operating system 35, one or more application programs 36, a computer mapping program 37, such as the Expedia Streets & Trips 2000 program mentioned above, having one embodiment of the present invention, and program data 38. A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Embodiments of the present invention are best described through example. FIGS. 2–8 graphically illustrate examples of the present invention as embodied in the mapping program 37. In a sequence of sample screen shots, FIGS. 2–8 illustrate two functions commonly performed by mapping programs: adding a destination not already identified and changing a destination already identified. In the following examples, the mapping program 37 allows the direct, graphical alteration of a pre-calculated route that begins in Atlanta and continues to Seattle. Other destinations to be visited are included.

Figure 2:
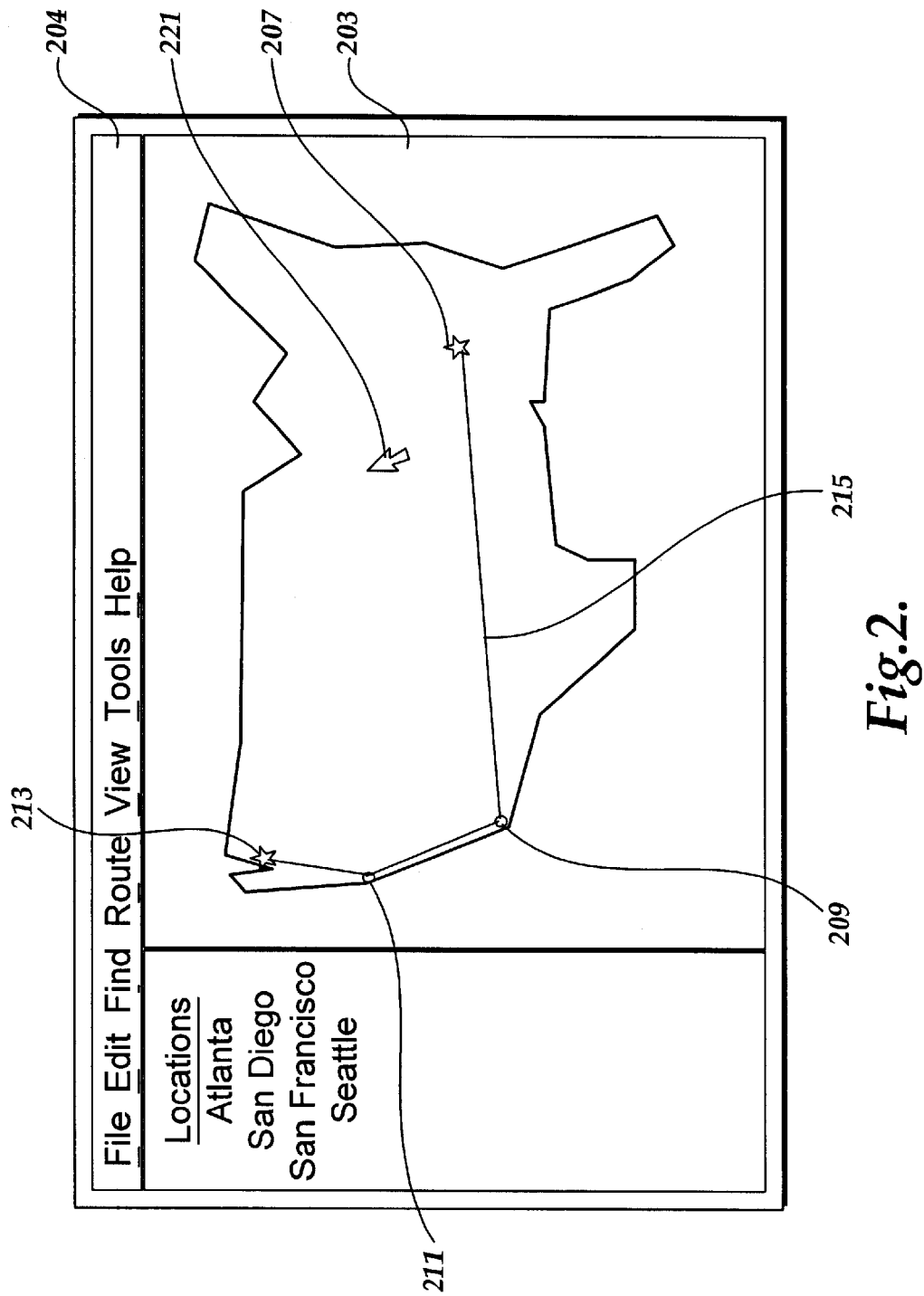
FIG. 2 is an exemplary screen display of one embodiment of the present invention illustrating a step in adding a new destination to a calculated route.

FIG. 2 is an illustrative screen display 201 of the mapping program 37 with a sample map 203 displayed below a menu bar 204. Identified on the map 203 are several destinations: Atlanta 207, San Diego 209, San Francisco 211, and Seattle 213. Atlanta 207 and Seattle 213 are identified with stars to indicate that they represent the starting destination and ending destination, respectively, of the route. The other destinations are illustrated as small circles. The route has been calculated that travels from Atlanta 207 to Seattle 213 through San Diego 209 and San Francisco 211. Each line connecting two destinations is termed a "link." The route is illustrated as the series of links, such as link 215, that connect the several destinations. Those skilled in the art will appreciate that the links are typically not straight lines but rather follow the topography of the roadways calculated to connect two destinations. However, for simplicity of description only, the links are illustrated as straight lines in these examples.

The screen display 201 also includes a listing portion 205 having a list of the several destinations along the route. The listing portion 205 details those destinations that have been identified through input from the user and are displayed on the map 203. Also shown is a pointer 221 corresponding to and under the control of an input device, such as the mouse 42 or a touchpad. As is known to those skilled in the art, the pointer 221 provides to the mapping program 37 a signal indicating an active segment of the display 201. Briefly described, a finite number of pixels of the pointer 221 (typically the tip of the arrow) are identified as the focus of the pointer 221. Whatever element of the screen display that corresponds with the focus of the pointer 221 is identified as having the focus of the pointer 221. In other words, when an element of the screen display is coincident with the focus of the pointer 221, that element is said to have the focus of the pointer 221. When the input device receives a triggering action, such as a mouse click or tap of a touchpad, the element having the focus of the pointer 221 at that moment is selected.

FIG. 2 illustrates the situation where a user has already input several destinations and caused the mapping program 37 to calculate the route along those several destinations. The mapping program 37 has generated and displayed a graphical representation of the route as it continues to each of the several destinations. Those skilled in the art will appreciate that several alternative forms of display are possible. For example, often mapping programs will display a textual description of the route including detailed driving instructions from destination to destination. A graphical representation has the advantage of providing the user with a more conceptual overview of the route. Mapping programs that perform only those functions (i.e., graphically represent a calculated route between destinations) are known and do not per se form a part of the present invention.

At this juncture, the user may often decide to modify the calculated route. For instance, the user may decide to include an additional destination to visit. Existing technologies require that the user resort to a text-based mechanism to input the additional destination, such as through a series of dialog boxes or textual input screens. Because of the limitations of existing technologies, the mapping program 37 could not determine the appropriate place in the route to insert the new destination based solely on the textual input of the new destination. Consequently, the mapping program 37 would then need to compute a new order for all the destinations prior to computing a new route. Although that system is still available, the present invention provides an alternative. This embodiment of the invention allows the user to direct the order in which to visit the destinations while adding the new destination, all in one intuitive step.

Figure 3:
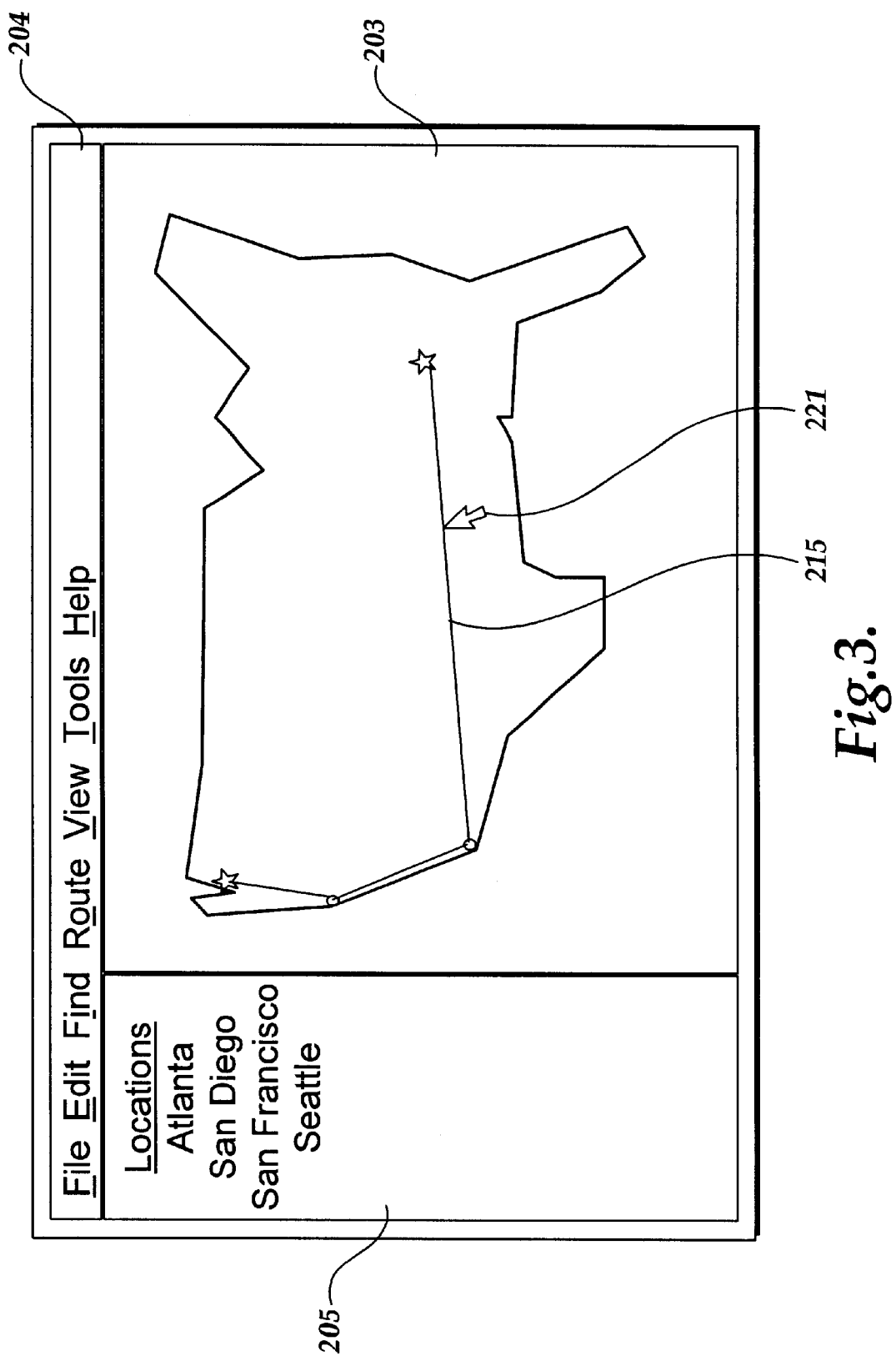
FIG. 3 is another exemplary screen display of one embodiment of the present invention illustrating another step in adding a new destination to a calculated route.

In FIG. 3, the user has decided to include Houston (not yet shown) as an additional destination to visit. In accordance with this embodiment of the invention, the user navigates the pointer 221, via the input device, to a portion of the route in which the new destination is to be added. In this example, the user is able to visually evaluate a preferable segment of the route in which to insert the new destination because the route is graphically represented on the map 203. As is apparent from the screen display 201, link 215 is closest to Houston and is the logical segment in which to insert a stop at Houston. Therefore, the user navigates the pointer 221 to link 215. The user then selects link 215 via the input device and pointer 221. Common selection mechanisms are a mouse "click" or a tap of a touchpad. The mapping program 37 recognizes that the pointer 221 has selected link 215 and, therefore, identifies link 215 as the one to be affected by the addition of the new destination.

Figure 4:
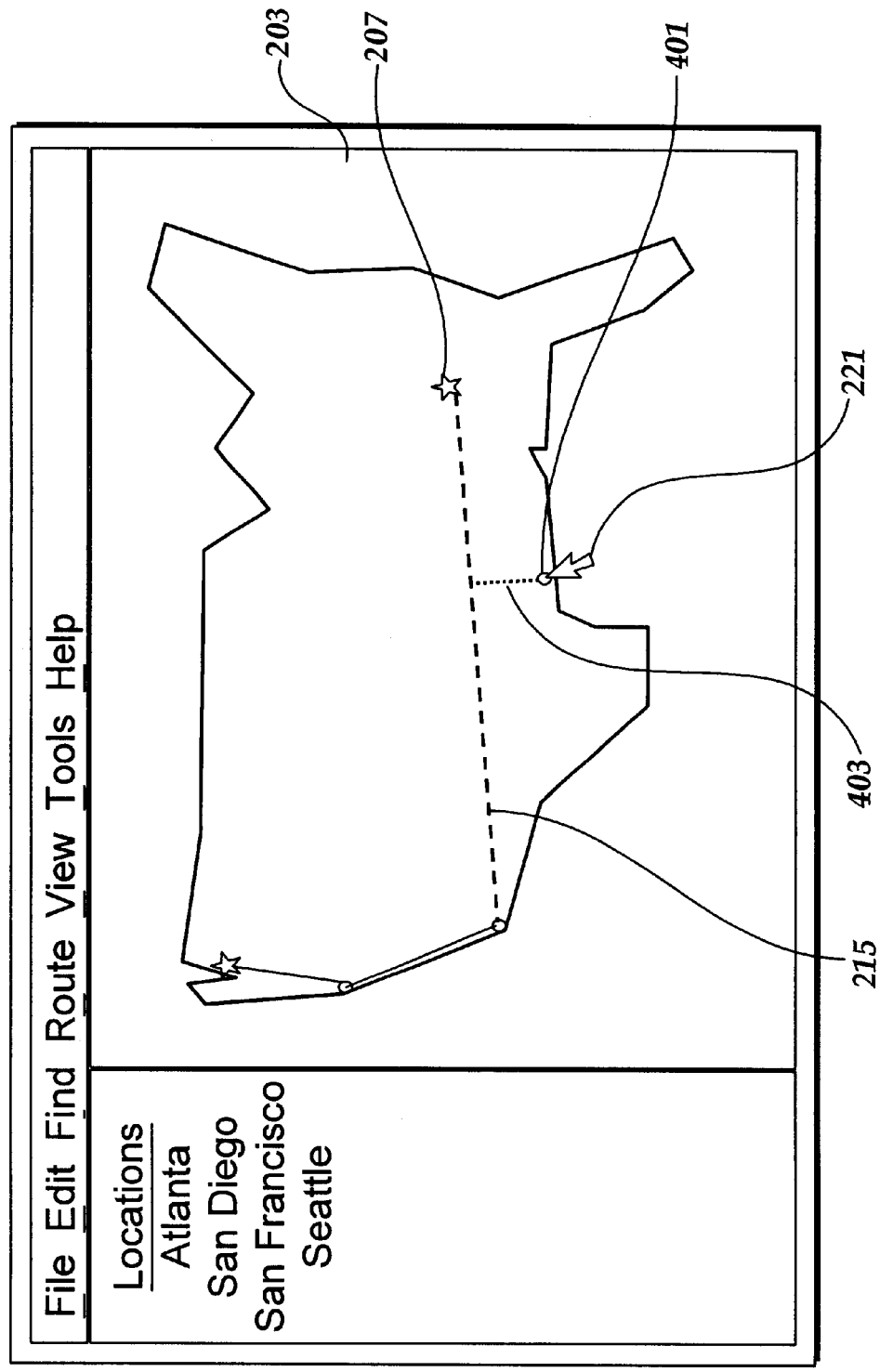
FIG. 4 is another exemplary screen display of one embodiment of the present invention illustrating another step in adding a new destination to a calculated route.

As shown in FIG. 4, the mapping program 37 may change the link 215 to a dashed line as a visual indication that the link 215 is identified to be deleted. The user then "drags" the link 215 to the new destination. Those skilled in the art will appreciate that "dragging" the link may include holding down a button on the mouse or other input device while navigating the pointer 221 to a new point on the map 203. In this example, the user drags the pointer 221 from the selected point on link 215 to the point corresponding to the new destination, Houston 401 in this example. The mapping program 37 may generate an additional dashed line 403 to indicate the progress of the dragging operation.

Figure 5:
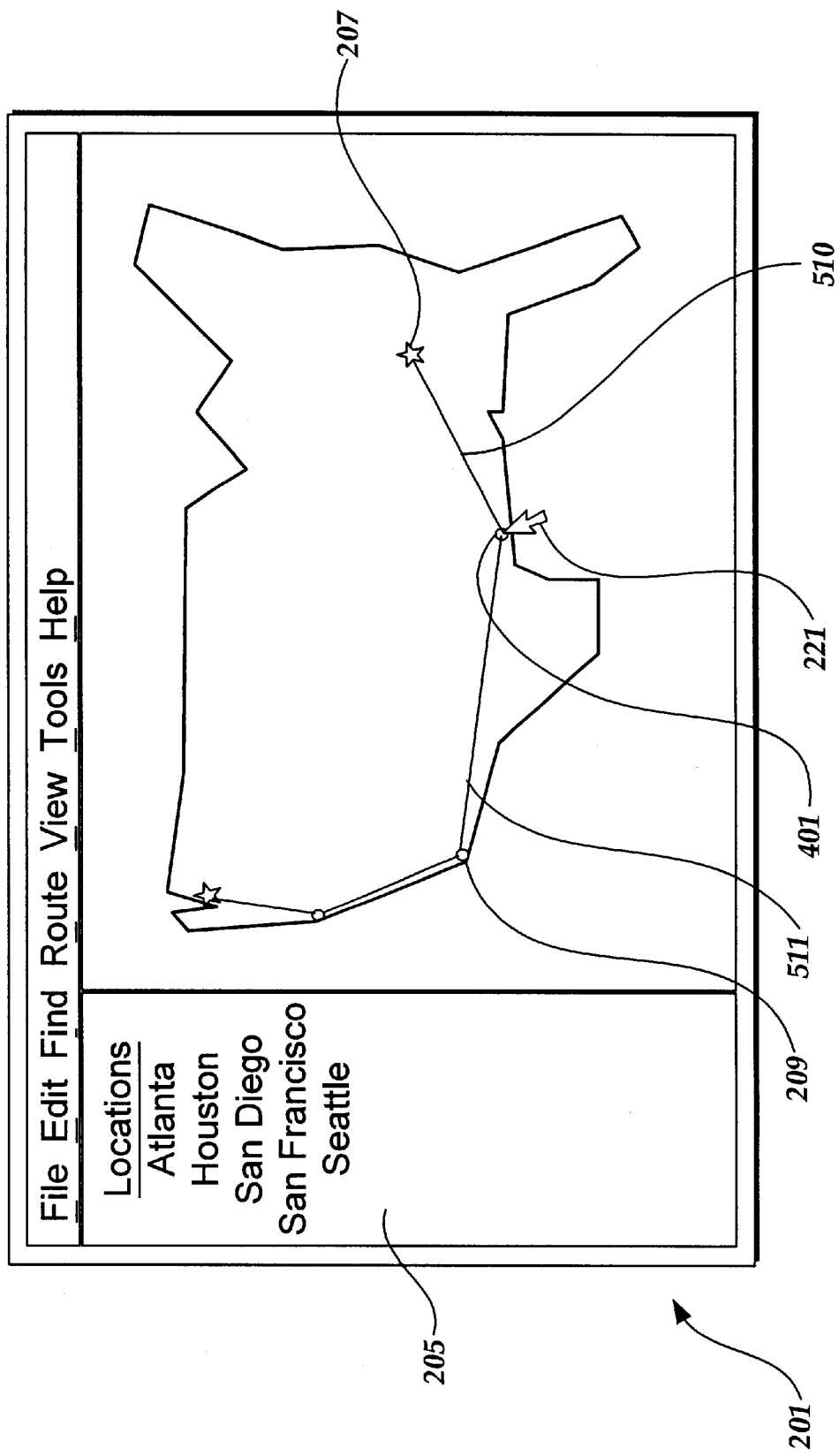
FIG. 5 is another exemplary screen display of one embodiment of the present invention illustrating the final step in adding a new destination to a calculated route.

As shown in FIG. 5, when the user terminates the dragging procedure, the mapping program 37 identifies the new destination. Typically, the dragging procedure is terminated by releasing the mouse button. That action signals the mapping program 37 to identify the destination having the focus of the pointer 221 at that moment as the new destination. As a result of selecting the link 215 and dragging the pointer 221 to Houston 401, the mapping program 37 is able to identify both the new destination to be added (Houston 401) and the portion of the route to be changed (link 215) all in one intuitive step. Once the new destination is identified, the mapping program 37 recalculates only that portion of the route affected by the new destination. In this example, only link 215 (FIG. 4) was affected by the addition of Houston 401. Consequently, that link is replaced (FIG. 5) by calculating a first new link 510 between Atlanta 207 and Houston 401, and calculating a second new link 511 between Houston 401 and San Diego 209. The mapping program 37 may recalculate the new links in the conventional manner. Many routines and algorithms are known for choosing the appropriate roadways for the new links, and the particular routine or algorithm for calculating the new links does not form a part of the present invention. In addition, the name "Houston" is added in the appropriate position in the listing portion 205 of the display 201, between "Atlanta" and "San Diego."

In this manner, the single operation of dragging link 215 to Houston 401 achieved two results: (1) it identified link 215 to be replaced and (2) it allowed the user to input the new destination. The result is a system without the burden of re-computing a preferred order of destinations each time a new destination is added. In other words, the new destination is directly inserted in the proper order because the user is presented with the graphical representation of the calculated route and graphically identifies the logical order of the destinations when inserting the new destination. Importantly, because the user directly identifies the position of the new destination, the mapping program 37 need not recalculate the entire route, but rather only the portion altered by the addition of the new destination.

Figure 6:
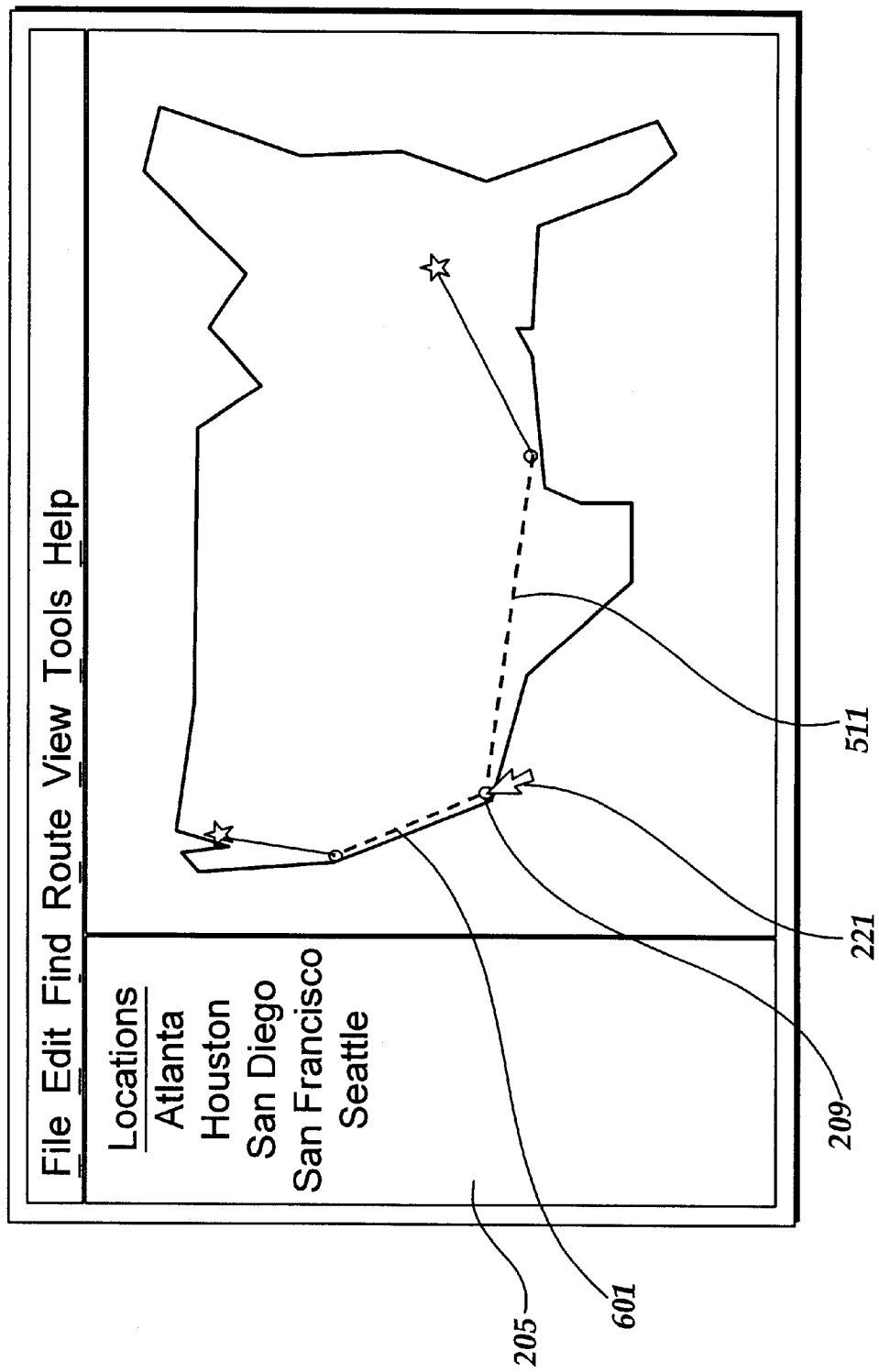
FIG. 6 is an exemplary screen display of one embodiment of the present invention illustrating a step in moving an existing destination in a calculated route.
Figure 7:
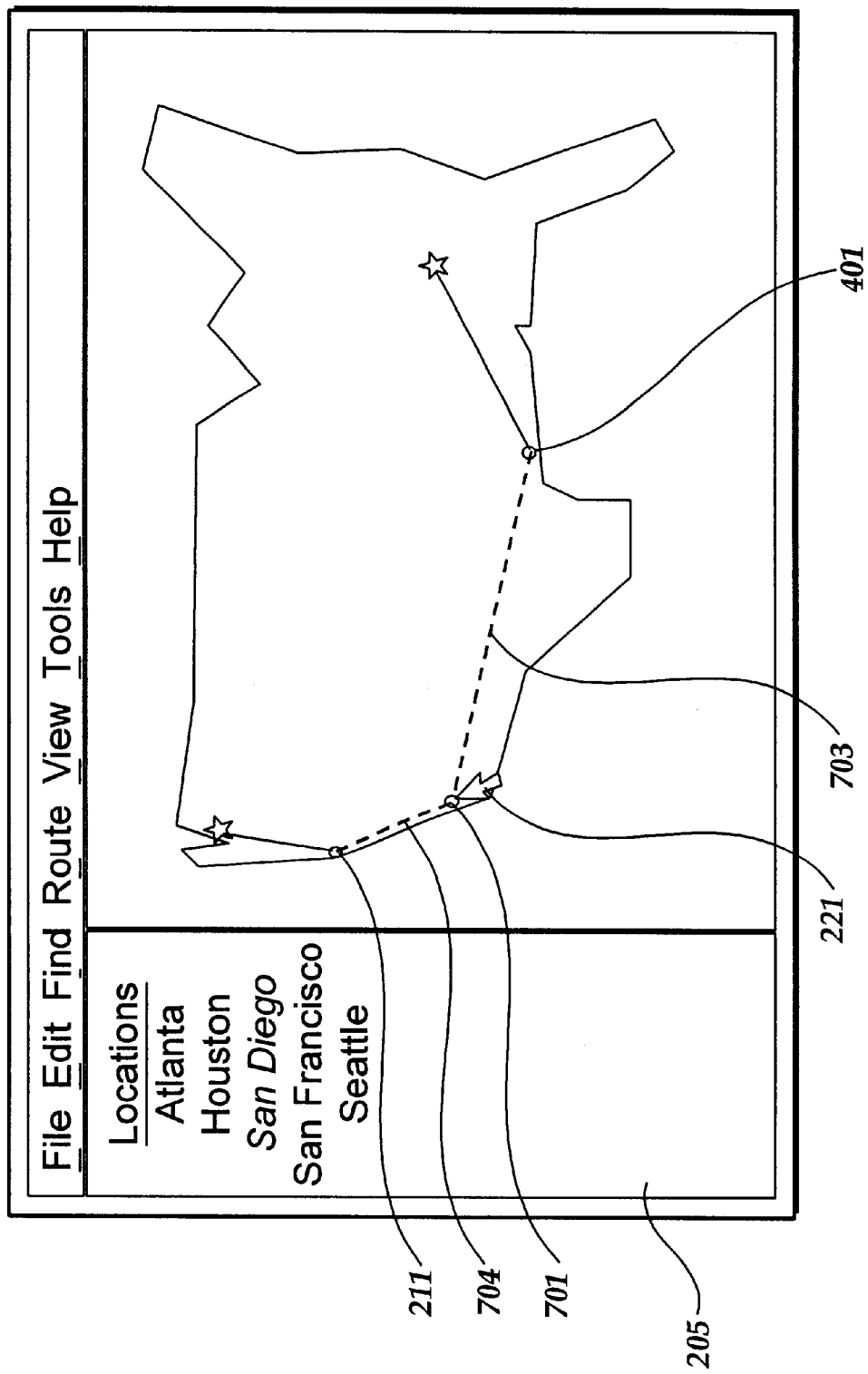
FIG. 7 is another exemplary screen display of one embodiment of the present invention illustrating another step in moving an existing destination in a calculated route.
Figure 8:
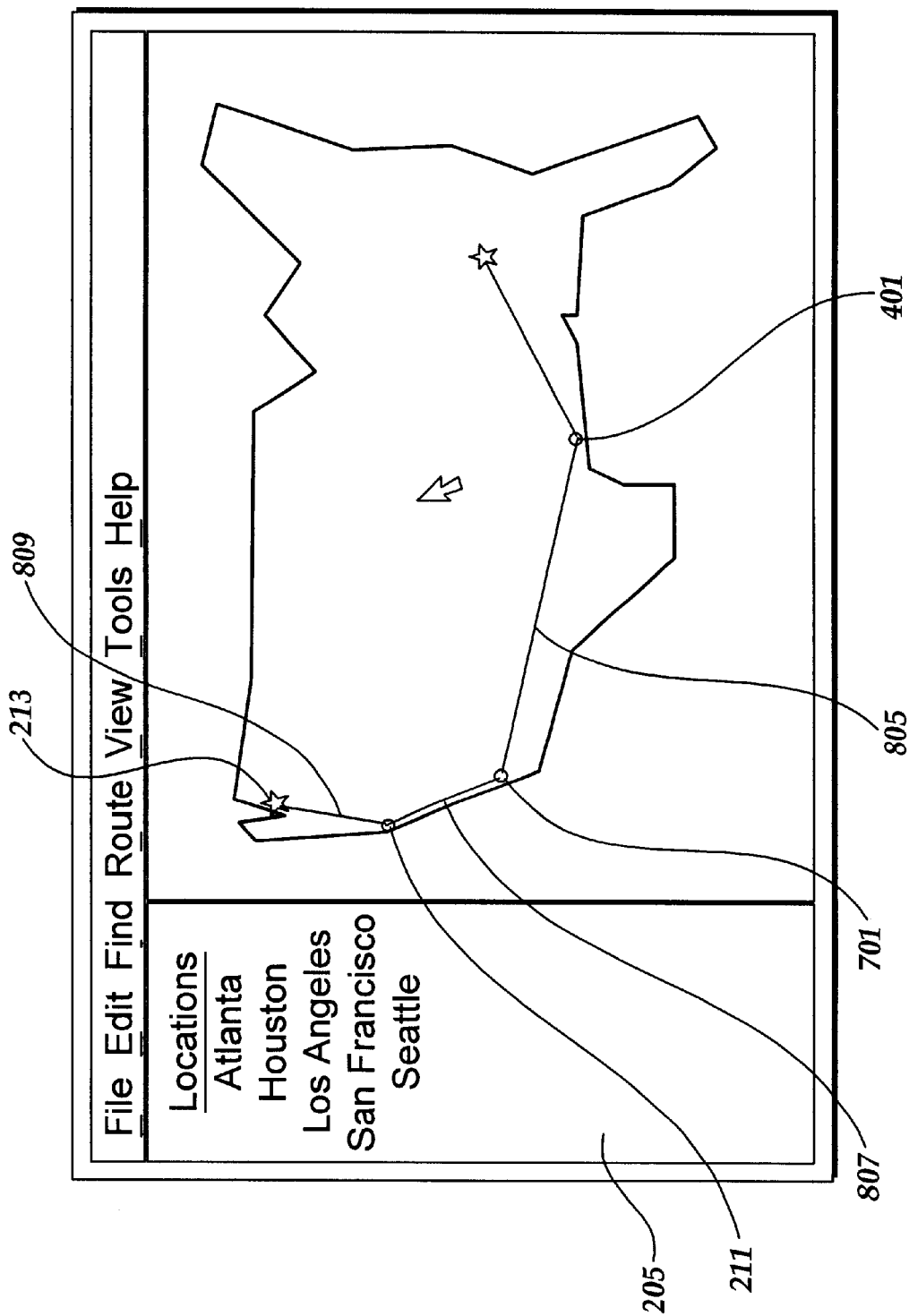
FIG. 8 is another exemplary screen display of one embodiment of the present invention illustrating the final step in moving an existing destination in a calculated route.

FIGS. 6–8 illustrate the situation where the user desires to change an existing destination, rather than adding a new destination. In this example, the user no longer desires to visit San Diego 209, but rather desires to visit Los Angeles (not yet shown). So the user again navigates the pointer 221 to the affected destination, here San Diego 209. The user then selects San Diego 209 by clicking a mouse button, tapping a touchpad, or any other acceptable mechanism for selecting the element having the focus of the pointer 221. As is shown in FIG. 6, selecting San Diego 209 immediately indicates to the mapping program 37 that link 511 and link 601 will be replaced. That indication may be graphically represented to the user by changing the lines of link 511 and link 601 from solid to dashed, as depicted.

As shown in FIG. 7, the user may then drag the route away from San Diego (no longer shown) to a new destination, here Los Angeles 701. As shown, the listing portion 205 may optionally indicate that San Diego is being removed from the route by changing the display format of the name "San Diego," such as by italicizing the font. In addition, as a convenience to the user, the mapping program 37 may continue to display a dashed line 703 between Houston 401 and the pointer 221, and a dashed line 704 between San Francisco 211 and the pointer 221. That feature is a convenience because the mapping program 37 delays calculating the actual route until the user terminates the dragging procedure. The dashed lines 703, 704 are displayed in order that the user may continue to view at least an approximation of the entire route.

As shown in FIG. 8, when the user terminates the dragging procedure, the mapping program 37 recalculates a new link 805 between Houston 401 and Los Angeles 701, and a new link 807 between Los Angeles 701 and San Francisco 211. The mapping program 37 need not recalculate any other portions of the route. For instance, the link 809 between San Francisco 211 and Seattle 213 was not recalculated because that link 809 has been unaffected by any changes yet described. Accordingly, the mapping program 37 is able to avoid the unnecessary delay to the user of recalculating the entire route when only a single portion is altered. In addition, the name "Los Angeles" is substituted in the listing portion 205 for the name "San Diego" to indicate that the destinations have changed. The mapping program 37 can directly identify the new order of the current list of destinations because the user directly altered the graphical representation of the route, eliminating the need for the mapping program 37 to compute the new order.

The described aspects of the mapping program 37 enable the user to modify the calculated route in many other ways as well. For example, if the user desires to travel down a particular road or highway that is not a part of the calculated route, the user can simply drag a portion of the route to the desired road or highway. In other words, in the above example, the user may drag link 807 (FIG. 8) from the calculated roadways to an alternative road or highway, such as the Pacific Coast Highway for a more scenic trip. In that way, the user is able to, in essence, override the route-selection criteria of the mapping program 37 for a limited and specific portion of the route. Therefore, if the user desires to take an alternative path for only a small portion of the route, the user may simply drag that portion to the desired alternative path and the route is redirected.

Figure 9:
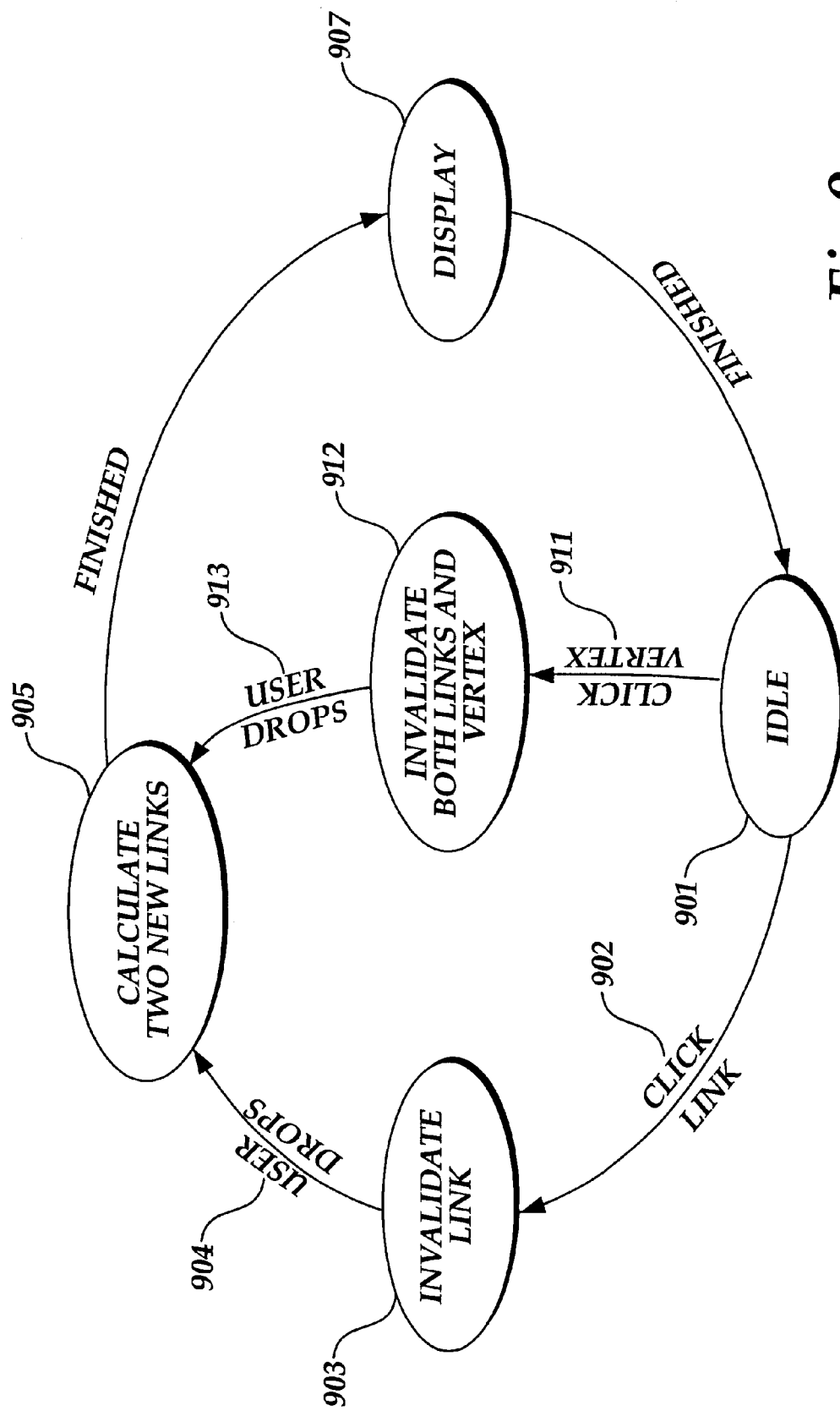
FIG. 9 is a flow diagram illustrating steps performed by a process according to the invention for altering a portion of a pre-calculated route.

FIG. 9 is a flow diagram illustrating steps performed by a process for altering a portion of a pre-calculated route, such as that embodied in the mapping program 37, to achieve the results described above. The flow diagram begins at idle state 901 where the mapping program 37 has been provided destinations for a trip and has calculated a route connecting those destinations. While in the idle state 901, the mapping program 37 awaits an action. While many actions may take the mapping program 37 out of the idle state 901, only two actions are most relevant to the present invention, and, therefore, only those two actions are illustrated and described. The first action is a click link action 902. The click link action 902 occurs when a link is selected, such as by a mouse click while the focus of the pointer 221 is on that link. For example, as illustrated in FIGS. 3 and 4, the click link action 902 occurs when the user selects link 215 and begins to drag the pointer 221 to Houston 401. The process responds to the click link action 902 by proceeding to block 903.

At block 903, the mapping program 37 invalidates the link selected by the click link action 902. Invalidating the link may merely involve identifying it to be replaced, or may include displaying the link with dashed lines (as illustrated in FIGS. 4 and 6), by changing the color or intensity of the link, or any other acceptable mechanism for changing the display of the link. With that link invalidated, the mapping program 37 again idles awaiting another input, the drop action 904. The drop action 904 occurs when the user stops dragging the pointer 221 and releases the mouse button or other mechanism. When the drop action 904 occurs, the mapping program 37 is able to identify a new destination to include with the list of existing destinations. The mapping program 37 identifies the destination having the focus of the pointer 221 when the drop action 904 occurs. For example, in FIG. 4, the drop action 904 occurs when the user has finished navigating the pointer 221 to Houston 401 and releases the mouse button. Houston 401 has the focus of the pointer 221 at that moment. Therefore, the mapping program 37 identifies Houston 401 as the new destination to be added.

In response to the drop action 904, the process proceeds from block 903 to block 905. At block 905, the mapping program 37 calculates two new links. The new links calculated are the ones connecting the new destination to the previous and subsequent destinations along the route. Calculating the links between those destinations, once the destinations have been identified, is performed in the conventional manner. In the example shown in FIG. 5, the two new links are link 510 and link 511. As mentioned above, the mapping program 37 is only required to recalculate the links affected by the addition of the new destination. The mapping program 37 is able to readily determine the affected links because the user identified them with the click link action 902 above by selecting the link in which to insert the new destination. Consequently, the mapping program 37 calculates only those two new links.

When the mapping program 37 is finished at block 905, processing exits that block and proceeds to block 907. At block 907, the mapping program 37 displays the new route, including the new destination just added and the newly calculated links. The mapping program 37 may optionally display an indication that the new destination was added, such as by adding the name of the new destination to a listing of destinations as illustrated in FIG. 5. Processing then returns to the idle state 901 where the mapping program 37 awaits another action.

The second action that causes processing to leave the idle state 901 is a click vertex action 911. The click vertex action 911 occurs when a destination is selected rather than a link. For instance, if the focus of the pointer 221 is on a destination when a mouse click is received, the mapping program 37 identifies that destination as a destination to be replaced. In response to the click vertex action 911, processing proceeds to block 912.

At block 912, the mapping program 37 invalidates the selected destination and the existing links associated with the destination. Typically, each destination has two associated links: one link to the destination and one link from the destination. However, if the destination selected by the click vertex action 911 is either a starting destination or an ending destination, then there is only one associated link. Invalidating the destination and the links may merely involve identifying them to be replaced, or may additionally include changing the display of the links or destination, such as with dashed lines or color as discussed above. With those elements invalidated, the mapping program 37 again idles awaiting another input, another drop action 913.

The drop action 913 generally occurs, just as described above, when the user stops dragging the pointer 221 and releases the mouse button. When the drop action 913 occurs, the mapping program 37 is able to identify a new destination to replace the destination identified by the click vertex action 911. The mapping program 37 identifies the destination having the focus of the pointer 221 when the drop action 913 occurs. For example, in FIG. 7, the drop action 913 occurs when the user has finished navigating the pointer 221 to Los Angeles 701 and releases the mouse button. Los Angeles 701 has the focus of the pointer 221 at that moment. Therefore, the mapping program 37 identifies Los Angeles 701 as the new destination to replace the destination selected by the click vertex action 911, here San Diego 209.

In response to the drop action 913, the process proceeds from block 912 to block 905, which performs again as described above and calculates new links to the new destination. It should be noted that if the destination moved through this process was either the starting point or ending point of the route, then the mapping program 37 only calculates one new link. Again, and as described above, when processing finishes at block 905, the process continues to block 907 where the new route is displayed. Finally, after the new route is displayed at block 907, the process returns to the idle state 901.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computerized mapping program that calculates a route connecting a plurality of destinations, a method of altering the route, comprising:
   displaying a graphical representation of the route;
   receiving a signal from a graphical pointer coincident with a point along the graphical representation of the route;
   in response to receiving the signal, identifying a portion of the route corresponding to the point along the graphical representation of the route as a selected portion; and
   redirecting the selected portion of the existing route in accordance with a second signal from the graphical pointer, the second signal identifying a new destination to be included in the selected portion of the route.

2. The method of claim 1, wherein the identified portion of the route is one destination in the plurality of destinations.

3. The method of claim 1, wherein the identified portion of the route is a link between two destinations in the plurality of destinations.

4. The method of claim 1, wherein the step of altering the selected portion comprises dragging the selected portion to the new destination.

5. The method of claim 1, wherein the second signal comprises a dragging signal issued to the mapping program and specifying a movement of the graphical pointer from the point along the graphical representation of the route to the new destination.

6. The method of claim 5, wherein the second signal further comprises a drop signal issued to the mapping program and specifying that the movement of the graphical pointer is complete, the drop signal operative to identify the new destination.

7. The method of claim 6, wherein the drop signal occurs when the graphical pointer is coincident with the new destination.

8. The method of claim 1, wherein the route comprises an existing destination and at least one link connecting the existing destination to another destination, and wherein the selected portion of the route is the existing destination, and wherein the step of altering the selected portion comprises:

eliminating the existing destination from the route; and calculating a first new link between the other destination and the new destination.

9. The method of claim 8, further comprising:

if a second link connects the existing destination to a third destination, eliminating the second link; and calculating a second new link between the third destination and the new destination.

10. The method of claim 9, wherein the second signal comprises a dragging signal issued to the mapping program and specifying a movement of the graphical pointer from the existing destination to the new destination.

11. The method of claim 10, wherein the second signal further comprises a drop signal issued to the mapping program and specifying that the movement of the graphical pointer is complete, the drop signal occurring when the graphical pointer is coincident with the new destination.

12. In a computerized mapping program that calculates a route connecting a plurality of destinations, wherein the route comprises a first destination, a second destination, and a link connecting the first destination to the second destination, a method of altering the route, comprising:

displaying a graphical representation of the route;

receiving a signal from a graphical pointer coincident with a point along the graphical representation of the route;

in response to receiving the signal, identifying a portion of the route corresponding to the point along the graphical representation of the route as a selected portion, wherein the selected portion of the route is the link connecting the first destination to the second destination; and altering the selected portion of the route in accordance with a second signal from the graphical pointer, the second signal identifying a new destination to be included in the plurality of destinations, wherein altering the selected portion comprises eliminating the link from the route, calculating a first new link between the first destination and the new destination, and calculating a second new link between the new destination and the second destination.

13. The method of claim 12, wherein the second signal comprises a dragging signal issued to the mapping program and specifying a movement of the graphical pointer from the point along the graphical representation of the route to the new destination.

14. The method of claim 13, wherein the second signal further comprises a drop signal issued to the mapping program and specifying that the movement of the graphical pointer is complete, the drop signal operative to identify the new destination.

15. A computer-readable medium having computer-executable instructions for graphically altering a route connecting a plurality of destinations on a map, which when executed comprise:

displaying a graphical representation of the route;

receiving a first signal from a graphical pointer coincident with a point along the graphical representation of the route;

in response to receiving the first signal, identifying a portion of the route corresponding to the point along the graphical representation of the route as a selected portion;

receiving a second signal from the graphical pointer, the second signal occurring when the graphical pointer is coincident with a new destination to be included in the plurality of destinations; and in response to receiving the second signal, redirecting the selected portion of the route to include the new destination.

16. The computer-readable medium of claim 15, wherein the step of identifying the portion as the selected portion comprises deleting the portion from the route.

17. The computer-readable medium of claim 15, wherein the identified portion is a link connecting a first destination and a second destination in the plurality of destinations.

18. The computer-readable medium of claim 17, wherein the step of redirecting the route comprises:

invalidating the link connecting the two destinations;

calculating a first new link connecting the new destination to the first destination; and calculating a second new link connecting the new destination to the second destination.

19. The computer-readable medium of claim 15, wherein the second signal comprises a dragging signal specifying a movement of the graphical pointer from the point along the graphical representation of the route to the new destination.

20. The computer-readable medium of claim 19, wherein the second signal further comprises a drop signal specifying that the movement of the graphical pointer is complete, the drop signal operative to identify the new destination.

* * * * *